United States Patent
Gossain et al.

(10) Patent No.: US 8,243,603 B2
(45) Date of Patent: *Aug. 14, 2012

(54) METHOD AND SYSTEM FOR IMPROVING A WIRELESS COMMUNICATION ROUTE

(75) Inventors: Hrishikesh Gossain, Apopka, FL (US); Avinash Joshi, Orlando, FL (US)

(73) Assignee: Motorola Solutions, Inc., Schaumberg, IL (US)

( * ) Notice: Subject to any disclaimer, the term of this patent is extended or adjusted under 35 U.S.C. 154(b) by 1336 days.

This patent is subject to a terminal disclaimer.

(21) Appl. No.: 11/295,912

(22) Filed: Dec. 7, 2005

(65) Prior Publication Data

US 2007/0127379 A1    Jun. 7, 2007

(51) Int. Cl.
*G01R 31/08* (2006.01)

(52) U.S. Cl. ...... 370/237; 370/216; 370/230.1; 370/231; 370/235; 370/236; 370/238; 370/248; 370/252; 370/253; 455/445

(58) Field of Classification Search .......... 370/229–235, 370/236, 248, 252, 253, 216, 237, 238, 254–256; 709/223–226; 455/445
See application file for complete search history.

(56) References Cited

U.S. PATENT DOCUMENTS

| | | | |
|---|---|---|---|
| 5,442,624 A | 8/1995 | Bonomi et al. | |
| 6,381,228 B1 | 4/2002 | Prieto et al. | |
| 6,731,628 B1 | 5/2004 | Shiomoto et al. | |
| 6,778,502 B2 * | 8/2004 | Ricciulli | 370/238 |
| 6,807,165 B2 | 10/2004 | Belcea | |
| 6,844,841 B1 * | 1/2005 | Masciulli | 342/13 |
| 6,873,839 B2 | 3/2005 | Stanforth | |
| 6,940,832 B2 | 9/2005 | Saadawi et al. | |
| 6,954,435 B2 | 10/2005 | Billhartz et al. | |
| 6,961,310 B2 | 11/2005 | Cain | |
| 6,973,622 B1 | 12/2005 | Rappaport et al. | |
| 7,068,600 B2 * | 6/2006 | Cain | 370/230.1 |
| 7,394,776 B2 * | 7/2008 | Lee et al. | 370/310 |
| 7,408,911 B2 * | 8/2008 | Joshi | 370/338 |
| 7,570,628 B2 * | 8/2009 | Rangarajan et al. | 370/351 |

(Continued)

FOREIGN PATENT DOCUMENTS

KR    2005-0105553 A    11/2005

OTHER PUBLICATIONS

A Path Compression Technique for On-demand Ad-hoc Routing Protocols—V. C. Giruka et al—University of Kentucky—Jan. 2004—IEEE, pp. 144-153.

(Continued)

*Primary Examiner* — Christopher Grey
(74) *Attorney, Agent, or Firm* — Randi L. Karpinia

(57) ABSTRACT

A system and method for improving a current wireless communication route, between a source node and a destination node in an on-demand wireless communication network, enables the current communication route to be improved even when the current route has not failed. The method includes analyzing at a local node a packet transmission from the source node, the packet transmission comprising a current route metric (step 705). The local node then determines that it can provide an improved wireless communication route, between the source node and the destination node, having a better route metric than the current route metric (step 710). A route improvement message is then transmitted from the local node to the source node (step 740).

24 Claims, 4 Drawing Sheets

U.S. PATENT DOCUMENTS

| | | | |
|---|---|---|---|
| 7,606,176 B2* | 10/2009 | Joshi et al. | 370/255 |
| 7,706,282 B2* | 4/2010 | Huang | 370/238 |
| 7,710,880 B2* | 5/2010 | Yang | 370/237 |
| 8,036,207 B2* | 10/2011 | Sivakumar et al. | 370/351 |
| 2001/0036810 A1 | 11/2001 | Larsen | |
| 2002/0051425 A1 | 5/2002 | Larsson | |
| 2002/0058502 A1 | 5/2002 | Stanforth | |
| 2003/0118051 A1 | 6/2003 | Ooms | |
| 2003/0179718 A1 | 9/2003 | Ebata et al. | |
| 2003/0204587 A1* | 10/2003 | Billhartz | 709/224 |
| 2003/0204616 A1 | 10/2003 | Billhartz et al. | |
| 2004/0022223 A1 | 2/2004 | Billhartz | |
| 2004/0114569 A1 | 6/2004 | Naden et al. | |
| 2004/0143842 A1 | 7/2004 | Joshi | |
| 2004/0156345 A1 | 8/2004 | Steer et al. | |
| 2004/0203820 A1 | 10/2004 | Billhartz | |
| 2004/0260808 A1 | 12/2004 | Strutt et al. | |
| 2005/0053005 A1 | 3/2005 | Cain et al. | |
| 2005/0135330 A1 | 6/2005 | Smith et al. | |
| 2005/0174989 A1* | 8/2005 | Chen et al. | 370/351 |
| 2005/0286426 A1* | 12/2005 | Padhye et al. | 370/238 |
| 2006/0050630 A1* | 3/2006 | Kobayashi et al. | 370/216 |
| 2006/0104205 A1* | 5/2006 | Strutt et al. | 370/238 |
| 2006/0109787 A1* | 5/2006 | Strutt et al. | 370/235 |
| 2006/0268727 A1* | 11/2006 | Rangarajan et al. | 370/248 |
| 2007/0091811 A1* | 4/2007 | Thubert et al. | 370/238 |
| 2007/0097892 A1* | 5/2007 | Tsang | 370/310 |

OTHER PUBLICATIONS

Short: Self-Healing and Optimizing Routing Techniques for Mobile Ad Hoc Networks—C. Gui et al—University of California—MobiHoc Jun. 2003—pp. 279-2909.

A High-Throughput Path Metric for Multi-Hop Wireless Routing—D. DeCouto et al—M.I.T.—MobiCom Sep. 2003—13 pages.

International Search Report and Written Opinion for counterpart International Application No. PCT/US2006/61143 mailed on Mar. 14, 2008.

English language translation of Notice of Allowance for counterpart Japanese Patent Application No. JP2008-543556 mailed on Jan. 19, 2011.

English language translation of Office Action for counterpart Korean Patent Application No. KR10-2008-7013569 issued on Mar. 31, 2010.

English language translation of Office Action for counterpart Korean Patent Application No. KR10-2008-7013569 issued on Sep. 2, 2010.

Johnson, D., et al., "Dynamic Source Routing in Ad Hoc Wireless Networks," in Mobile Computing, Academic Publishers, 1996.

Marina, M., et al., "On-Demand Multipath Distance Vector Routing in Ad Hoc Networks," Proceedings of IEEE ICNP, Nov. 2001.

Hicks, M., et al., "PLANet: An Active Internetwork," Department of Computer and Information Science, University of Pennsylvania.

Lee, S., et al., "The Case for a Multi-Hop Wireless Local Area Network".

Just, M., et al., "Resisting Malicious Packet Dropping in Wireless Ad Hoc Networks".

Non Final Office Action mailed Oct. 11, 2007 in related U.S. Appl. No. 10/986,698, Guenael T. Strutt, filed Nov. 12, 2004 (MESH120).

Non Final Office Action mailed Mar. 14, 2008 in related U.S. Appl. No. 10/986,698, Guenael T. Strut, filed Nov. 12, 2004 (MESH120).

Notice of Allowance mailed Oct. 1, 2008 in related U.S. Appl. No. 10/986,698, Guenael T. Strutt, filed Nov. 12, 2004 (MESH120).

Notice of Allowance mailed Dec. 24, 2008 in related U.S. Appl. No. 10/986,698, Guenael T. Strutt, filed Nov. 12, 2004 (MESH120).

International Search Report and Written Opinion for related International Application No. PCT/US2005/39945 mailed on Dec. 22, 2006 (MESH120).

English language translation of Germany Office Action for related Application No. 11 2005 022 759.7 issued on Oct. 28, 2010 (MESH120).

English language translation of Korea Office Action for related Application No. 10-2007-7010797 issued on Jan. 22, 2009 (MESH120).

Hong, D., "Survey of Techniques for Prevention and Control of Congestion in an ATM Network," Department of Information and Computer Science, IEEE, University of California, 1991, pp. 204-210.

* cited by examiner

METHOD AND SYSTEM FOR IMPROVING A WIRELESS COMMUNICATION ROUTE

FIELD OF THE INVENTION

The present invention relates generally to wireless networks, and in particular to improving routes between mobile nodes in an on-demand wireless network.

BACKGROUND

On-demand routing algorithms enable dynamic, self-starting, multihop routing between participating mobile nodes in ad hoc wireless communication networks. Various methods exist for determining a preferred on-demand route through a network. For example an ad hoc, on-demand distance vector (AODV) routing protocol allows mobile nodes to obtain routes quickly for new destinations, and does not require nodes to maintain routes to inactive destinations. Thus AODV protocols allow mobile nodes to respond to route failures and changes in network topology in a timely manner.

However, after a route is established in an on-demand routing protocol, mobile nodes generally continue using the established route until there is a need, based for example on a failure of the established route, to discover an alternative route. Therefore, even if an improved route becomes available, due for example to a change in network topology, change in link condition, or movement of one or more mobile nodes, the mobile nodes along the established route will nonetheless continue using the established route. Hence, improved routes that may become available are not utilized.

One known method for addressing the above problem is to periodically transmit route request (RREQ) packets, which explores all possible routing options in a wireless neighborhood. However, because the RREQ packets are transmitted as a broadcast, such RREQ packets can place a large overhead on wireless bandwidth. Broadcasting of RREQ packets also works against a basic principle of on-demand routing protocols, which is to conserve bandwidth by avoiding unnecessary packet transmissions.

Other known methods of route improvement in on-demand routing protocols are based on "nexthops," which endeavor to optimize a route by minimizing a number of "hops" between nodes. These methods however risk the formation of loops. Additionally, in varying link conditions, such methods can be prone to generating RREQ packets excessively and when RREQ packets are not needed, thus unnecessarily increasing overhead on a wireless bandwidth. Furthermore, such methods risk adopting a route that is improved based on one criteria, such as node minimization, but which is inferior based on another criteria, such as route stability.

BRIEF DESCRIPTION OF THE FIGURES

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
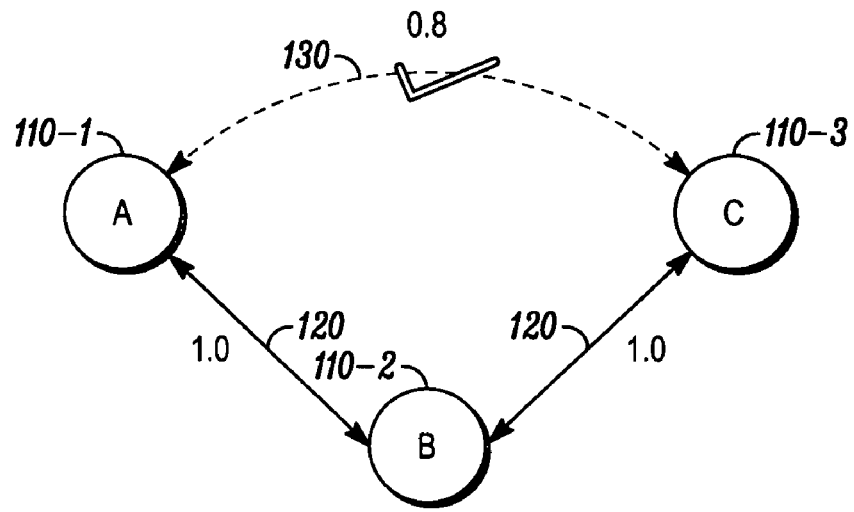
FIG. 1 is a schematic diagram illustrating an ad hoc, on-demand wireless communication network comprising a plurality of mobile nodes, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to improving a wireless communication route. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of improving a wireless communication route described herein. The non-processor circuits may include, but are not limited to, a radio receiver, a radio transmitter, signal drivers, clock circuits, power source circuits, and user input devices. As such, these functions may be interpreted as steps of a method to improve a wireless communication route. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIG. 1, a schematic diagram illustrates an ad hoc, on-demand wireless communication network 100 comprising a plurality of mobile nodes 110-n according to an embodiment of the present invention. The network 100 can be, for example, a wireless Mobile Ad Hoc Network (MANET), and the nodes 110-n can be associated with devices such as mobile phones or handheld radios. Also, fixed nodes 110-n can be associated with devices such as routers, as for example a router installed in a wireless local area network (WLAN) access point (AP) on a light pole in a city. As described in more detail below, data are routed through the network 100 using various routes that are determined dynamically.

Each route line 120 extending from a node 110-n to one or more other nodes 110-n represents a functioning wireless communication interface operatively connecting two nodes 110-n together. The interfaces may conform, for example, to a wireless standard such as IEEE 802.11.

Consider, according to the present embodiment, that the "A" node 110-1 is a source node, which is an originator of a communication, and the "C" node 110-3 is a destination node, which is the destination of the communication. The lines 120 extending between the "A" node 110-1 and the "B" node 110-2, and between the "B" node 110-2 and the "C" node 110-3, together indicate a current wireless communication route between mobile nodes "A" and "C" via "B". The "B" node 110-2 thus acts as an intermediate node 110-n in a "two-hop" communication route.

Further consider that the "C" node 110-3 is within radio communication range of both the "A" node 110-1 and the "B" node 110-2. That means that each time the "A" node 110-1 transmits a packet destined for the "C" node 110-3, the "C" node 110-3 will receive the packet twice (i.e., once when the packet is transmitted from "A" to "B", and a second time when the packet is transmitted from "B" to "C"). Thus the "C" node 110-3 is in a position to monitor two independent routes between the "A" node 110-1 and the "C" node 110-3.

According to an embodiment of the present invention, any nodes 110-n that are within radio range of both a source node 110-1 and a destination node 110-3 are referred to as local nodes, and can assist in determining an improved route between the source node 110-1 and the destination node 110-3. Note that in FIG. 1, the "C" node 110-3 acts as both a local node 110-n and as a destination node 110-3. Such a situation occurs whenever a destination node 110-3 is within radio range of a source node 110-1, but is not currently receiving communications directly from the source node 110-1.

For example, the dashed line 130 extending between the "A" node 110-1 and the "C" node 110-3 indicates an alternative, direct wireless communication route between the "A" node 110-1 and the "C" node 110-3. If the "C" node 110-3 determines that the direct route line 130 represents an improved route over the indirect route lines 120, the "C" node 110-3 transmits a route improvement message to the "A" node 110-1. After receiving the route improvement message, the "A" node 110-1 can decide to abandon the current indirect route along lines 120, and use the direct route line 130 when it sends additional packets to the "C" node 110-3.

In a real-world ad hoc, on-demand wireless network environment, possibly involving many more mobile nodes 110-n than the three nodes 110-n shown in FIG. 1, after a route is established the mobile nodes 110-n continue using the established route until there is a need to discover an alternative route—even if an improved route is immediately available. The present invention provides a system and method for improving a current wireless communication route between mobile nodes 110-n by efficiently comparing route metrics of at least one alternative route with a route metric of the current route. According to different embodiments of the present invention, various parameters can be used to define a route metric including but not limited to throughput, delay, jitter, signal strength, packet completion rate, or combinations thereof.

For example, one parameter that can be used to define a route metric is a Packet Completion Rate (PCR). In FIG. 1 the numbers next to each indirect route line 120 and next to the direct route line 130 represent a respective PCR for each route. For example, the number 1.0 next to the lines 120 indicates that 100% of packets are successfully transmitted from the "A" node 110-1 to the "B" node 110-2 and then to the "C" node 110-3. The PCR for the route represented by line 130 is shown as 0.8, indicating that 80% of packets are successfully transmitted between the "A" node 110-1 and the "C" node 110-3. Thus if a route metric is based solely on PCR, the indirect route lines 120 will comprise a better route metric than the direct route line 130.

Another parameter that can be used to define a route metric is an Expected Transmission Time (ETT), which is an estimate of the time required to transmit a packet between two nodes 110-n. ETT is a function of PCR, delay, and other system parameters, and can be considered in some embodiments of the present invention as a highly accurate way of estimating the quality of a communication link.

Figure 2:
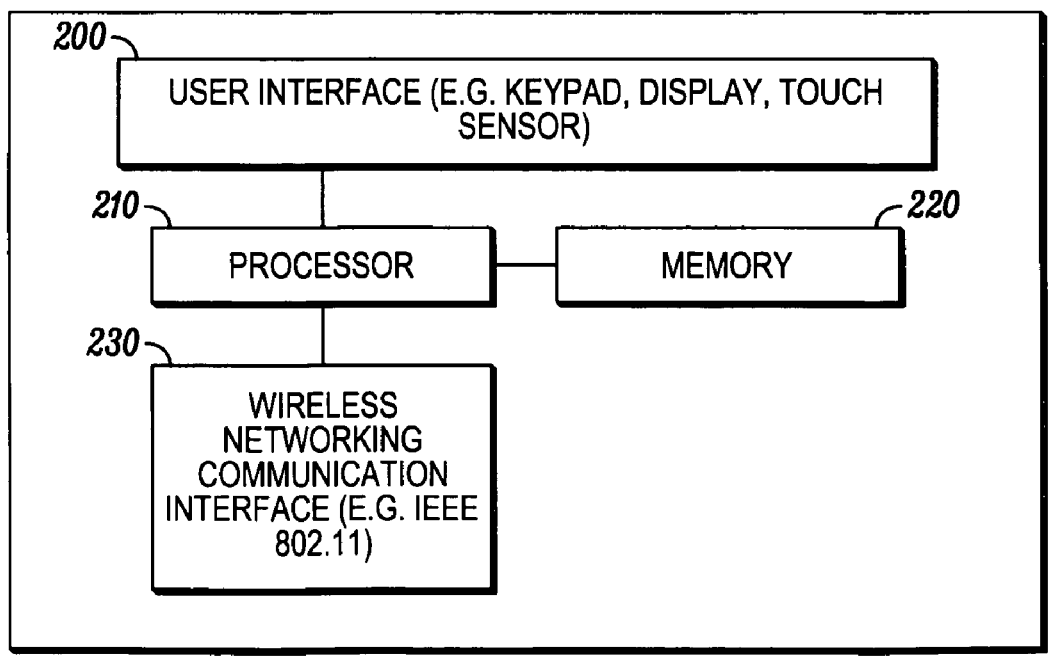
FIG. 2 is a schematic diagram illustrating components of a typical wireless mobile node operating within a network, according to an embodiment of the present invention.

Referring to FIG. 2, a schematic diagram illustrates components of a typical wireless mobile node 110-n operating within a network 100, according to an embodiment of the present invention. The node 110-n can be any type of electronic communication apparatus having wireless communication capability, such as a mobile telephone, personal digital assistant, or wireless router. The node 110-n can include various elements such as the following: a user interface 200 such as a keypad, display or touch sensor; a processor 210 to control operating features of the node 110-n; a memory 220 to store, for example, data and computer program code components; and an ad hoc wireless networking communication interface 230, which conforms to a wireless standard such as IEEE 802.11 and enables the node 110-n to communicate wirelessly with other nodes 110-n.

The user interface 200, memory 220 and communication interface 230 are each operatively connected to the processor 210. Those skilled in the art will appreciate that the memory 220 may comprise various types of memory such as a random access memory (e.g., static random access memory (SRAM)), read only memory (e.g., programmable read only memory (PROM)), electrically erasable programmable read only memory (EPROM), or hybrid memory (e.g., FLASH) as is well known in the art. The processor 210 then accesses a computer useable medium in the memory 220, which medium includes computer readable program code components configured to cause the node 110-n to execute the functions of the present invention.

Figure 3:
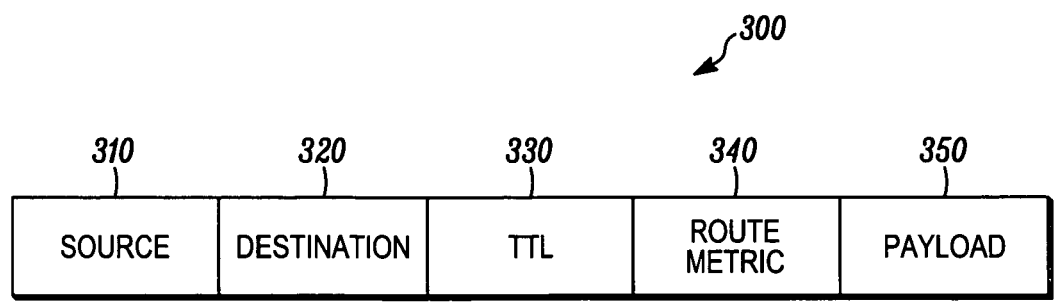
FIG. 3 is a schematic diagram illustrating a modified data packet, according to an embodiment of the present invention.

Referring to FIG. 3, a schematic diagram illustrates a modified data packet 300, according to an embodiment of the present invention. The data packet 300 comprises, in a header, a source field 310, a destination field 320, a time-to-live (TTL) field 330 and a route metric field 340. Following the header is a payload field 350. The route metric field 340 comprises data concerning the quality of a route through which a packet 300 travels. The route metric field 340 thus can comprise PCR data, ETT data or other data related to a route. Further, according to an embodiment of the present invention, the route metric field 340 is updated at each intermediate hop along a route to indicate a cumulative route metric.

Referring again to FIG. 1, consider a modified data packet 300 according to the present invention that is destined for the "C" node 110-3 and routed from the "A" node 110-1 through the intermediate "B" node 110-2. Consider further that the route metric field 340 in the packet 300 comprises PCR data. As described above, the route metric field 340 that is defined for the route between the "A" node 110-1 and "B" node 110-2 thus will be updated during the hop from the "B" node 110-2 to the "C" node 110-3. So, for example, here a PCR data component in the route metric field 340 in a packet 300 received at the "C" node 110-3, equals 1.0 because the PCR for both hops along the route equals 100%.

As another example, consider that the route metric field 340 in the packet 300 comprises ETT data. Again, as described above, the route metric field 340 that is defined for the route between the "A" node 110-1 and "B" node 110-2 will be updated during the hop from the "B" node 110-2 to the "C" node 110-3. An ETT data component in the route metric field 340 in a packet 300 received at the "C" node 110-3, thus comprises the total estimated transmission time between the "A" node 110-1 and the "C" node 110-3.

If a local node 110-n determines that it can provide an improved route between a source node 110-1 and destination node 110-3, the local node 110-n transmits a route improvement message to the source node 110-1. The route improvement message indicates that the local node 110-n can provide a wireless communication route having a higher route metric than the route metric of the current route.

For example, a route improvement message can comprise a request for a source node 110-1 to transmit a route request (RREQ) packet. Based on received responses to an RREQ, the source node 110-1 will then re-determine an optimized route to a destination node 110-3. According to an embodiment of the present invention, route improvement messages are not transmitted every time a local node 110-n determines that it can provide an improved route to a destination node 110-3. Rather, a route improvement message is transmitted only when a local node 110-n determines that it can provide an improved route having a route metric that exceeds a route metric of a current route.

According to another embodiment of the present invention, a route improvement message is transmitted only when a local node 110-n determines that it can provide an improved route having a route metric that exceeds a route metric of a current route by a predetermined threshold. For example, a predetermined threshold can be set at 10%, so that a route metric of an improved route must exceed a route metric of a current route by 10% or more before a route improvement message is transmitted. It will be appreciated by those skilled in the art that such a threshold can be set at various levels depending on the needs of a particular network to minimize bandwidth use.

According to a further embodiment of the present invention, transmission of a route improvement message from a local node 110-n to a source node 110-1 is delayed for a predetermined time interval. Such a predetermined time interval is used to monitor the stability of an improved route. That ensures that route improvement messages are not sent concerning improved but unstable routes, which may temporarily comprise a high route metric but which rapidly degrade to a low route metric. For example, during a predetermined time interval a route metric should not vary significantly due to node mobility or changing link conditions. If a stability of an improved wireless communication route falls below a predetermined threshold during a predetermined time interval, a route improvement message is not sent from a local node 110-n to a source node 110-1.

Further, transmission of a route improvement message from a local node 110-n to a source node 110-1 can be delayed for a random time interval, such as 0 or twice the Round Trip Time (RTT) between the source node 110-1 and the destination node 110-3. That enables other local nodes 110-n, which also may identify an improved route over a current route, to send alternative route improvement messages. For example, if a route improvement message from a second local node 110-n is received by a first local node 110-n during a random time interval generated at the first local node 110-n, where both the first and second local nodes 110-n have identified an improved route concerning an identical current route, then a route improvement message from the first local node 110-n is suppressed or cancelled and is not sent to the source node 110-1.

Figure 4:
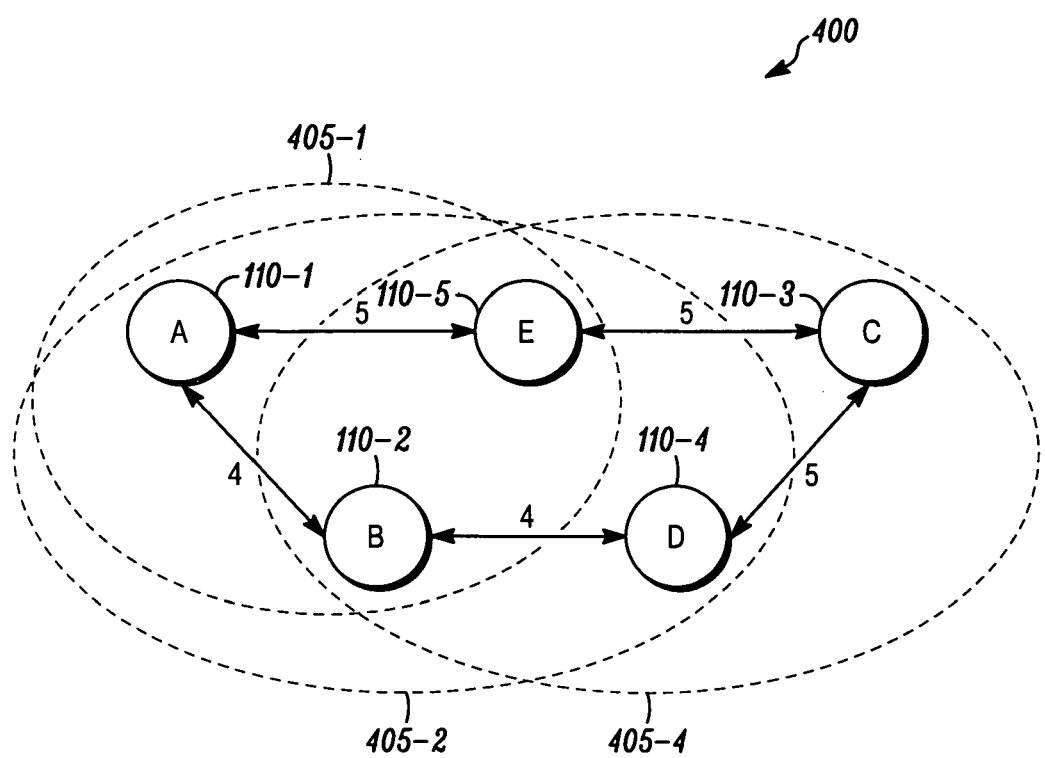
FIG. 4 is a schematic diagram illustrating a wireless network comprising a "multi-hop" communication route between a source node and a destination node, according to an embodiment of the present invention.

Referring to FIG. 4, a schematic diagram illustrates a wireless network 400 comprising a "multi-hop" communication route between a source node 110-1 and a destination node 110-3, according to an embodiment of the present invention. In this example, a current wireless communication route between the source "A" node 110-1 and the destination "C" node 110-3 is via local "B" node 110-2 and via local "D" node 110-4. Thus, in this embodiment there are three "hops" in the current wireless communication route. The dashed lines 405-1, 405-2, 405-4 indicate an outer limit of the direct radio range of the respective nodes 110-1, 110-2, 110-4. A local "E" node 110-5 is further shown located inside the radio range of all of the nodes 110-1, 110-2, 110-4. Further, consider that the "E" node 110-5 is also in direct radio range of the "C" node 110-3. Here, when a modified packet 300 is sent from the "A" node 110-1 to the "C" node 110-3 using the current route, the "E" node 110-5 receives the same packet three times in its routing layer (i.e., once from the "A" node 110-1, once from the "B" node 110-2 and once from the "D" node 110-4).

In the example shown in FIG. 4, the local "E" node 110-5 determines according to the teachings of the present invention whether it can provide an improved route between the "A" node 110-1 and the "C" node 110-3. For example, consider that the numbers shown between each of the nodes 110-n represent an ETT for each "hop", respectively, between the nodes 110-n. Because route metrics are cumulative across hops, an ETT data component of a route metric for the total route from the "A" node 110-1 to the "B" node 110-2 to the "D" node 110-4 and to the "C" node 110-3 equals 4+4+5=13. However, an ETT data component of a route metric for a potential improved route from the "A" node 110-1 to the "E" node 110-5 to the "C" node 110-3 equals 5+5=10. Because lower transmission times are generally desirable, the ETT data components indicate that the route through the "E" node 110-5 may present an improved route over the current route.

Figure 5:
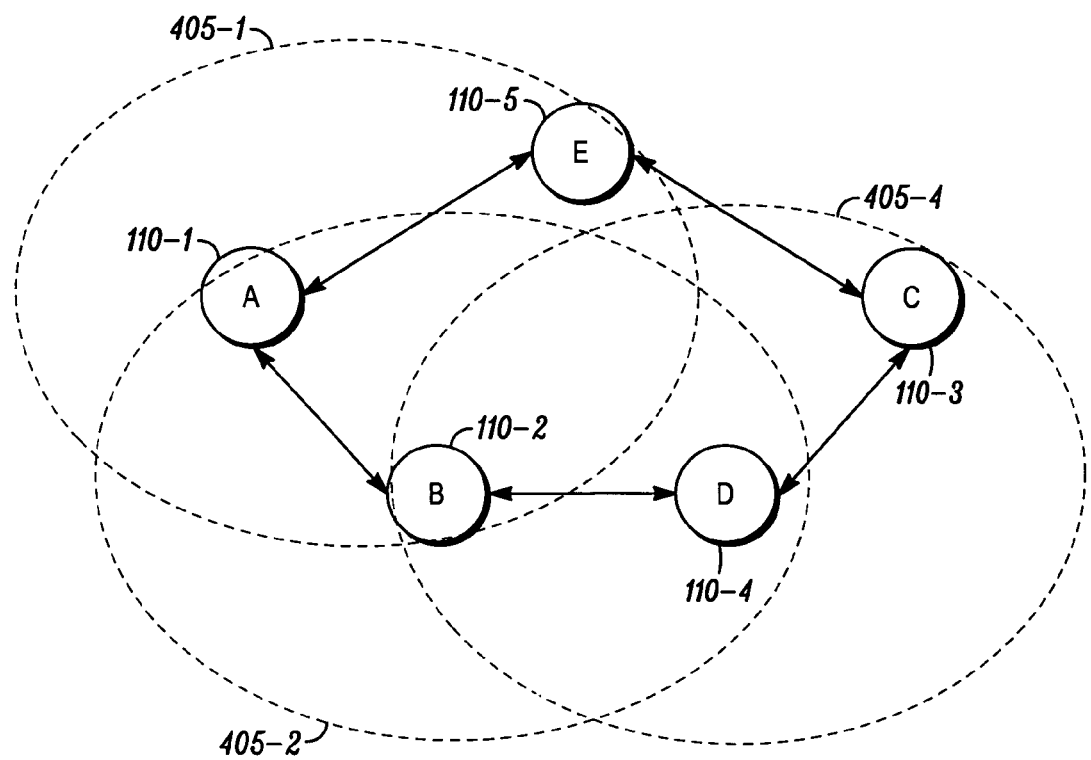
FIG. 5 is a schematic diagram illustrating another wireless network comprising a "multi-hop" communication route between a source node and a destination node, according to an embodiment of the present invention.

Referring to FIG. 5, a schematic diagram illustrates another wireless network 500 comprising a "multi-hop" communication route between a source node 110-1 and a destination node 110-3, according to an embodiment of the present invention. The embodiment here is similar to that described in reference to FIG. 4, except that the local node 110-5 is not within the transmission range of local nodes 110-2, 110-4. Therefore, during transmission of a modified packet 300 from "A" node 110-1 to "B" node 110-2 to "D" node 110-4 to "C" node 110-3, the local "E" node 110-5 receives the packet transmission only once—i.e., when the packet 300 is sent from the source "A" node 110-1. In this example, the "E" node 110-5 cannot determine whether it can provide an improved route based on data from the "B" node 110-2 or "D" node 110-4. However, when a packet 300 is transmitted back to the "A" node 110-1 from the "C" node 110-3, the "E" node 110-5 will be able to determine whether it can provide an improved route.

Figure 6:
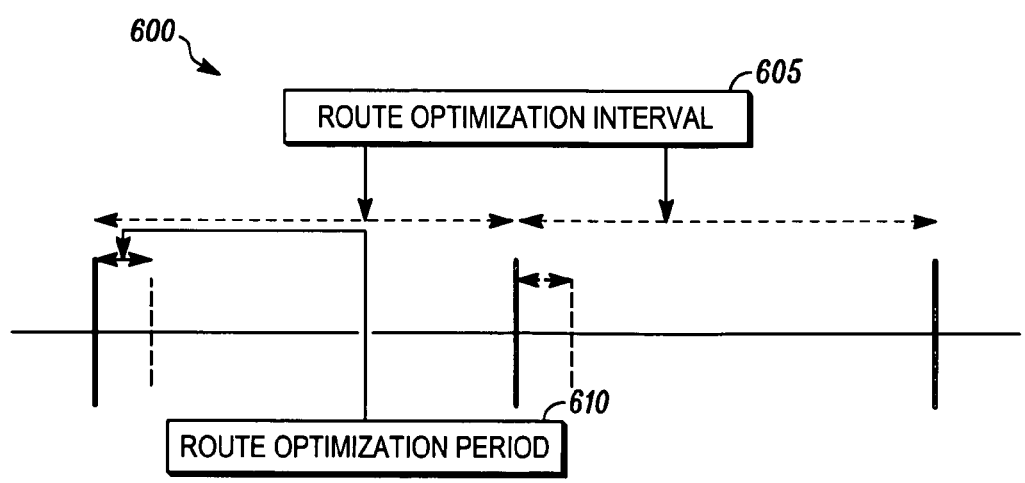
FIG. 6 is a time line illustrating a further method for minimizing bandwidth, processor resources, and network traffic congestion, according to an embodiment of the present invention.

Referring to FIG. 6, a time line 600 illustrates a further method for minimizing bandwidth, processor resources, and network traffic congestion, according to an embodiment of the present invention. The analysis at a local node 110-n concerning whether an improved route exists in a wireless network, according to the teachings of the present invention, not need to occur continuously. Such analysis, which generally can be referred to as "snooping", can proceed efficiently when it is programmed to occur only during specific periods. For example, a route optimization interval 605 is an interval during which a node 110-n generally snoops a MAC layer packet to see if the node 110-n can provide a more optimized route. A route optimization period 610 then can be defined as a component of a route optimization interval 605. Local nodes 110-n then are programmed to perform snooping only during route optimization periods 610, thus minimizing bandwidth, processor resources, and network congestion during the remaining part of a route optimization interval 605.

Figure 7:
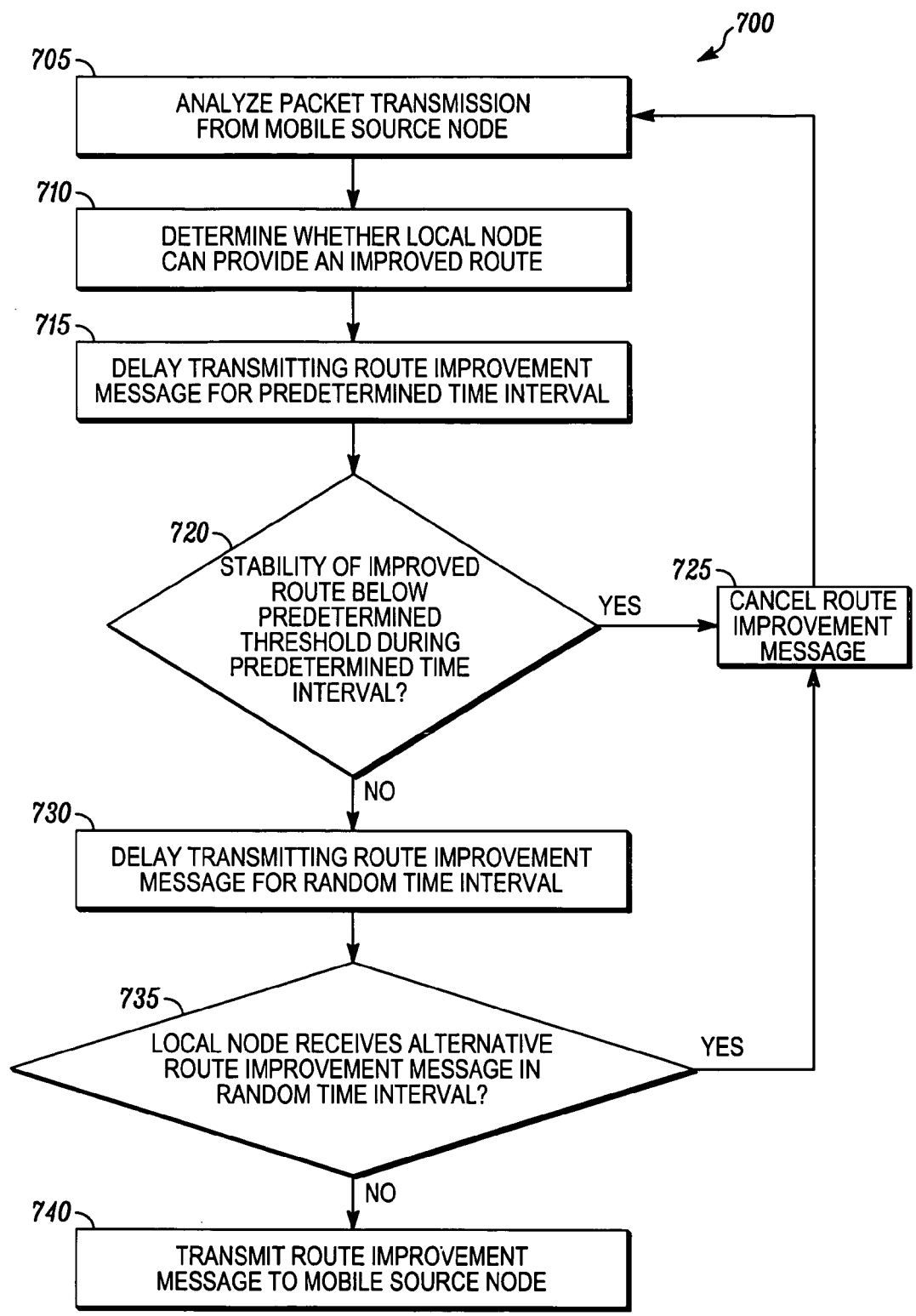
FIG. 7 is a general flow diagram illustrating a method for improving a current wireless communication route between a source node and a destination node in an on-demand wireless communication network, according to an embodiment of the present invention.

Referring to FIG. 7, a general flow diagram illustrates a method 700 for improving a current wireless communication route between a source node 110-1 and a destination node 110-3 in an on-demand wireless communication network, according to an embodiment of the present invention. First, at step 705, a packet transmission from a source node 110-1 is analyzed at a local node 110-n. At step 710, the local node 110-n determines whether it can provide an improved wireless communication route between the source node 110-1 and the destination node 110-3, where the improved route has a better route metric than the current route metric. If at step 710 it is determined that an improved route can be provided, at step 715 transmission of a route improvement message from the local node 110-n to the source node 110-1 is delayed for a predetermined time interval, in order to monitor the stability of the improved route. At step 720, it is determined whether the stability of the improved route falls, during the predetermined time interval described at step 715, below a predetermined threshold. If so, at step 725 the route improvement message is cancelled. The method 700 then loops back to step 705 where another packet transmission is analyzed.

However, if at step 720 the stability of the improved route does not fall below the predetermined threshold during the predetermined time interval, the method 700 continues at step 730 where transmission of the route improvement message is delayed by a random time interval. At step 735 it is determined whether an alternative route improvement message, concerning the same current route, is received from another local node 110-n. If so, at step 725 the route improvement message is cancelled. If no alternative route improvement messages are received at step 735, then at step 740 the route improvement message is transmitted to the source node 110-1.

Advantages of the present invention thus include the ability to switch a current communication route in an on-demand wireless communication network to an improved route, even when the current route has not failed. An improved route can be determined by local nodes 110-n in a network irrespective of whether the local nodes 110-n are in a current communication route. Comparisons of improved routes and current routes can be made based on various factors such as Packet Completion Rates (PCRs) or Expected Transmission Times (ETTs), and whether an improved route is stable. Further, the present invention enables route improvement messages to be generated only when needed, thus reducing bandwidth overhead and conserving network resources.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for improving a current wireless communication route between a source node and a destination node in an on-demand wireless communication network, the method comprising:

analyzing at a local node a data packet transmission from the source node, the data packet transmission including a current route metric of a current active route between the source node and the destination node, wherein the local node is within radio range of both the source node and the destination node, and further wherein the local node is not operating within the current active route;

determining at the local node that the local node can provide an improved wireless communication route as compared to the current active route, between the source node and the destination node, having a better route metric than the current route metric; and transmitting a route improvement message from the local node to the source node, wherein the route improvement message informs the source node that the improved wireless communication route is available through the local node and requests the source node to transmit a route request (RREQ) packet.

2. The method of claim 1, wherein determining at the local node that the local node can provide an improved wireless communication route comprises determining that an improved route metric is better than the current route metric by a predetermined threshold.

3. The method of claim 1, wherein determining at the local node that the local node can provide an improved wireless communication route comprises comparing respective Packet Completion Rates (PCRs) of the improved wireless communication route and the current wireless communication route.

4. The method of claim 1, wherein determining at the local node that the local node can provide an improved wireless communication route comprises comparing respective Expected Transmission Times (ETTs) of the improved wireless communication route and the current wireless communication route.

5. The method of claim 1, wherein determining at the local node that the local node can provide an improved wireless communication route comprises comparing parameters of the improved wireless communication route and the current wireless communication route, wherein the parameters are selected from a group comprising throughput, delay, jitter, signal strength, and packet completion rate.

6. The method of claim 1, wherein determining at the local node that the local node can provide an improved wireless communication route comprises analyzing PCR or ETT data received from an intermediate node in the current wireless communication route.

7. The method of claim 1, further comprising delaying transmitting the route improvement message for a predetermined time interval.

8. The method of claim 7, wherein transmitting the route improvement message occurs only when a stability of the improved wireless communication route does not fall below a predetermined threshold during the predetermined time interval.

9. The method of claim 1, further comprising delaying transmitting the route improvement message for a random time interval.

10. The method of claim 9, wherein transmitting the route improvement message occurs only when an alternative route improvement message is not received during the random time interval.

11. The method of claim 1, wherein analyzing at a local node a packet transmission from the source node occurs only during a route optimization period.

12. The method of claim 1, further comprising:
transmitting the route request packet (RREQ) by the source node; and
re-determining by the source node an optimized wireless communication route to the destination node based at least in part on one or more received responses to the route request packet (RREQ).

13. A system for improving a current wireless communication route in an on-demand wireless communication network, the system comprising a local node comprising:
a wireless networking communication interface, operating to receive a data packet transmission from a source node and destined for a destination node, the data packet transmission including a current route metric of a current active route between the source node and the destination node, wherein the local node is within radio range of both the source node and the destination node, and further wherein the local node is not operating within the current active route;
a processor operatively connected to the communication interface for analyzing the current route metric including determining whether the local node can provide an improved wireless communication route as compared to the current active route; and
a memory operatively connected to the processor;
the wireless networking communication interface further operating to transmit a route improvement message when the local node can provide an improved wireless communication route as compared to a current active route, between the source node and the destination node, having a better route metric than the current route metric of the current active route, wherein the route improvement message informs the source node that the improved wireless communication route is available through the local node and requests the source node to transmit a route request (RREQ) packet.

14. The system of claim 13, wherein the memory of the local node comprises a non-transitory computer useable medium having non-transitory computer readable program code components configured to cause the local node to:
analyze a data packet transmission from the source node, the data packet transmission including the current route metric;
determine that the local node can provide the improved wireless communication route, between the source node and the destination node, having a better route metric than the current route metric; and
transmit the route improvement message from the local node to the source node.

15. The system of claim 14, wherein determining at the local node that the local node can provide an improved wireless communication route comprises determining that an improved route metric is better than the current route metric by a predetermined threshold.

16. The system of claim 14, wherein determining at the local node that the local node can provide an improved wireless communication route comprises comparing respective Packet Completion Rates (PCRs) of the improved wireless communication route and the current wireless communication route.

17. The system of claim 14, wherein determining at the local node that the local node can provide an improved wireless communication route comprises comparing respective Expected Transmission Times (ETTs) of the improved wireless communication route and the current wireless communication route.

18. The system of claim 14, wherein determining at the local node that the local node can provide an improved wireless communication route comprises comparing parameters of the improved wireless communication route and the current wireless communication route, wherein the parameters are selected from a group comprising throughput, delay, jitter, signal strength, and packet completion rate.

19. The system of claim 14, wherein determining at the local node that the local node can provide an improved wireless communication route comprises analyzing PCR or ETT data received from an intermediate node in the current wireless communication route.

20. The system of claim 14, wherein the non-transitory computer readable program code components are further configured to delay transmitting the route improvement message for a predetermined time interval.

21. The system of claim 20, wherein transmitting the route improvement message occurs only when a stability of the improved wireless communication route does not fall below a predetermined threshold during the predetermined time interval.

22. The system of claim 14, further comprising delaying transmitting the route improvement message for a random time interval.

23. The system of claim 22, wherein transmitting the route improvement message occurs only when an alternative route improvement message concerning the current route is not received during the random time interval.

24. The system of claim 14, wherein analyzing at the local node the packet transmission from the source node occurs only during a route optimization period.

* * * * *

UNITED STATES PATENT AND TRADEMARK OFFICE
CERTIFICATE OF CORRECTION

| | | |
|---|---|---|
| PATENT NO. | : 8,243,603 B2 | Page 1 of 1 |
| APPLICATION NO. | : 11/295912 | |
| DATED | : August 14, 2012 | |
| INVENTOR(S) | : Gossain et al. | |

It is certified that error appears in the above-identified patent and that said Letters Patent is hereby corrected as shown below:

On the Title Page, in item (73), under "Assignee", in Column 1, Line 1, delete "Schaumberg," and insert -- Schaumburg, --, therefor.

Signed and Sealed this
Twenty-second Day of January, 2013

David J. Kappos
*Director of the United States Patent and Trademark Office*